Sheet 1, 4 Sheets.

C. O. Crosby.

Making Sewing Needles.

No. 3,911. Reissued Apr. 12, 1870.

Witnesses.
Chas. H. Stanford.
Wallace B. Stoddard.

Inventor
C. O. Crosby,
By his Atty John E. Earle.

Sheet 2, 4 Sheets.
C. O. Crosby.
Making Sewing Needles.
No. 3,911. Reissued Apr. 12, 1870.
Fig. 3.
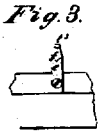
Fig. 2.
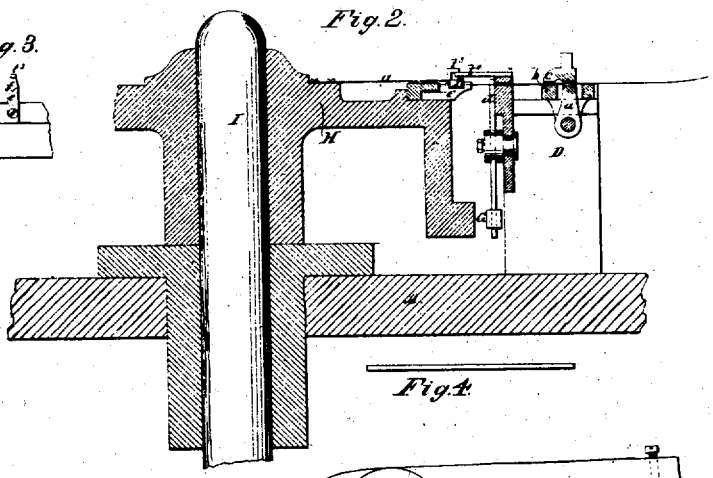
Fig. 4.
Fig. 5.
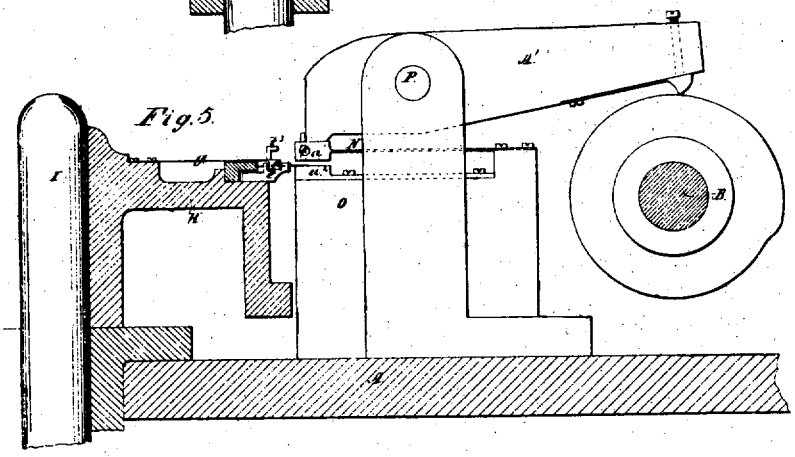
Fig. 6.
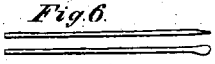
Fig. 7.
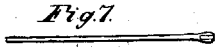
Fig. 8.
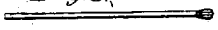
Fig. 9.
Fig. 10.
Witnesses
Charles H. Dunford
William B. Nordlund
Inventor.
C. O. Crosby
By his atty
John E. Earle Sheet 3, 4 Sheets.

C. O. Crosby.

Making Sewing Needles.

No. 3,911. Reissued Apr. 12, 1870.

Fig. 13½.

Witnesses.
Rufus H. Sanford.
William H. Stoddard

Inventor.
C. O. Crosby
per Pierce & John E. Earle

Sheet 4. 4 Sheets.

C. O. Crosby

Making Sewing Needles.

No. 3,911. Reissued Apr. 12, 1870.

Fig. 14 1/2.

Witnesses.
Rufus H. Sanford
William B. Stoddard

C. O. Crosby Inventor.
by his Atty
John E. Earle

United States Patent Office.

C. O. CROSBY, OF NEW HAVEN, CONNECTICUT.

*Letters Patent No.* 51,150, *dated November* 28, 1865; *reissue No.* 3,911, *dated April* 12, 1870

IMPROVED MACHINE FOR MAKING NEEDLES.

The Schedule referred to in these Letters Patent and making part of the same.

*To all whom it may concern:*

Be it known that I, C. O. CROSBY, of New Haven, in the county of New Haven and State of Connecticut, have invented a new Improvement in Machine for Making Sewing-Needles; and I do hereby declare the following, when taken in connection with the accompanying drawings and the letters of reference marked thereon, to be a full, clear, and exact description of the same, and which said drawings constitute part of this specification, and represent in—

Figure 1:
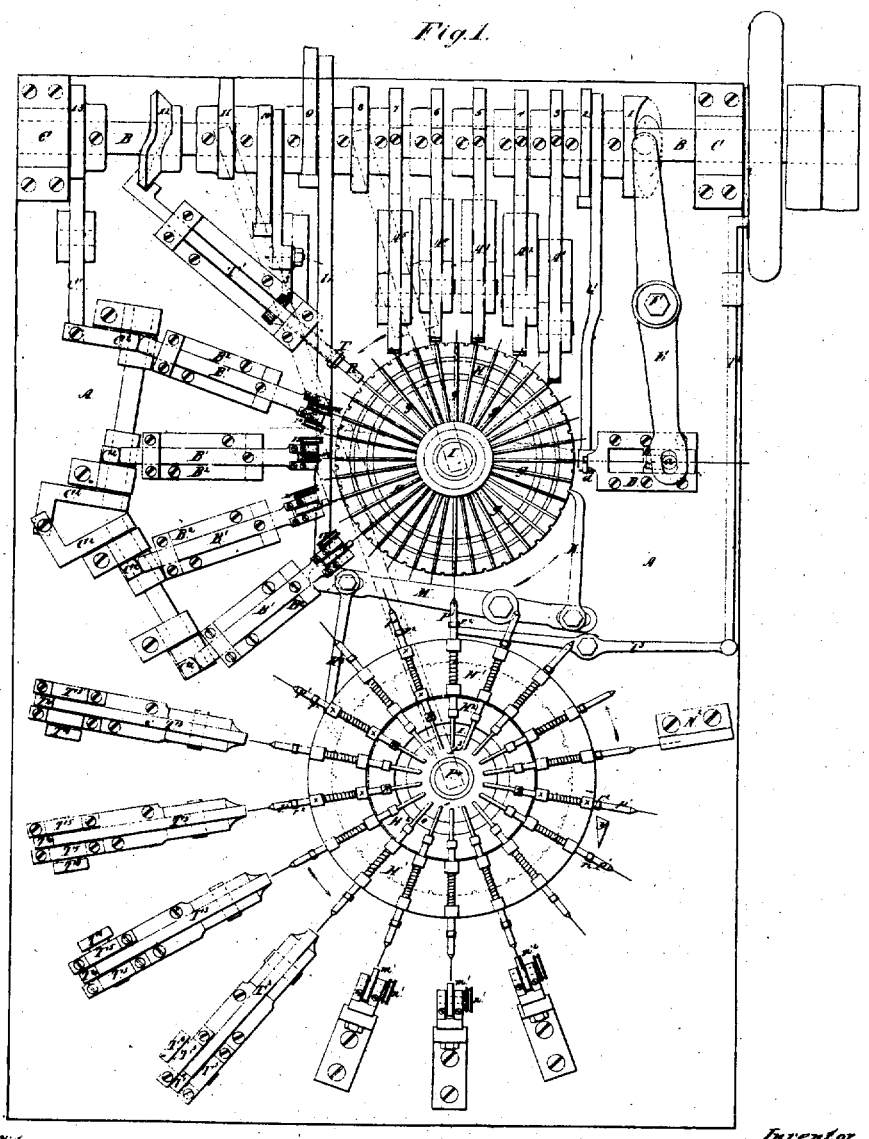
Figure 11:
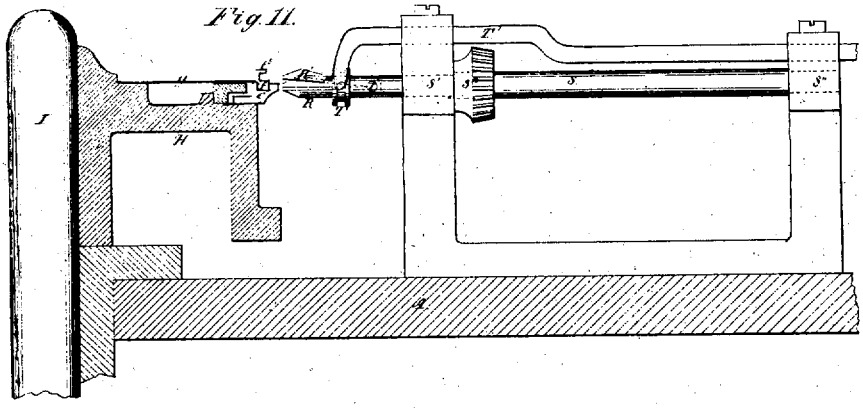
Figure 12:
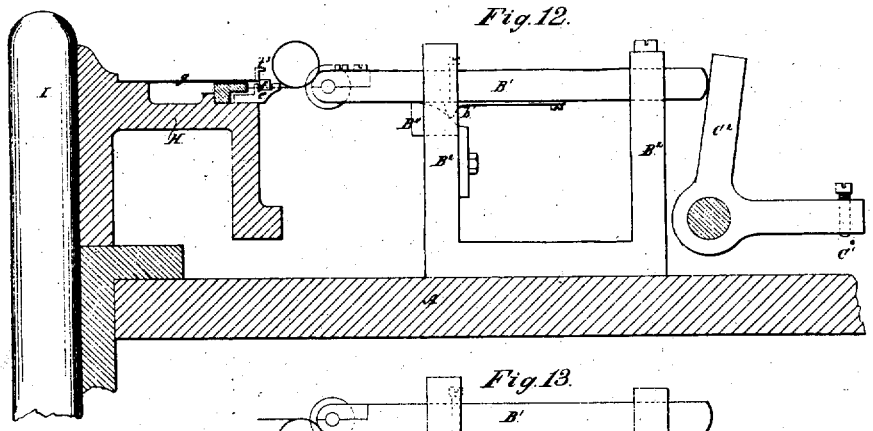
Figure 13:
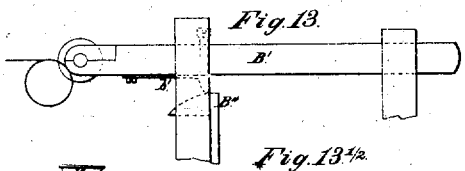
Figure 13:
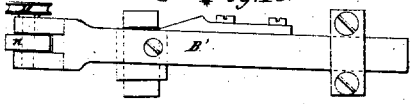
Figure 14:
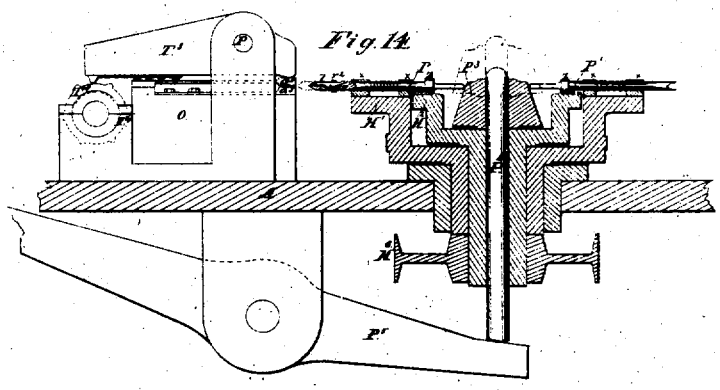
Figure 14:
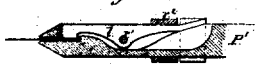

Figure 1, a plan view;
Figure 2, the feeding device;
Figure 3, the carrying-dies;
Figure 4, an enlarged view of the blanks;
Figure 5, the instruments for forming the eye and head;
Figures 6, 7, 8, 9, and 10, the wire as operated by the several eye and head-forming instruments;
Figures 11, 12, 13, and 13½, instruments for completing the head;
Figures 14, 14½, 15, and 16, instruments for the formation and completion of the point; and in
Figure 17, the discharging device.

This invention relates to an improvement in machinery for making sewing-needles, whereby the wire blanks from which the needles are to be made are supplied to an organized machine, which, receiving the wire blanks, automatically passes them through the several operations required to form the needle perfect and complete, in which condition the needles are discharged from the machine.

My invention consists in a series of dies constructed and arranged so that the successive operations of the several dies of the said series will form the eye and head of the needles, combined with an automatic translating device having an intermittent progressive movement, arranged so as to receive the blanks from which the needles are to be formed, and present the said blanks successively to each die of the said series for their respective operation to form the eye and head of the needle, and a device, also constructed and operating automatically, to receive the blanks from the said translating device, and to give to the needles a combined progressive and revolving movement, in combination with mechanism which operates upon the revolving blanks to form the points of the needles, so that, passing through the machine, both the head and point end of the needles are formed.

A is the bed-plate, upon which the operative mechanism of my machine is placed.

B is the driving-shaft, supported and revolving in proper bearings C, by the application of power to the pulley W.

D is the feeding device, which consists of a lever, *a*, hung beneath a slide, *b*, and extending up through the said slide, as seen in fig. 2.

To the upper end of the said lever *a* the lever E is attached, (see fig. 1.)

The said lever E is hung upon a fulcrum F, and operated by a cam, 1.

As the said lever E moves in toward the center of the machine, it will force the lever *a* forward, until the arm *c* of the said lever presses upon the wire which passes through the said lever *a*, as denoted in blue, fig. 2, thus grasping the wire. The continued move- of the lever E will carry the wire into the machine the required length for a single needle.

When thus carried in, the wire is cut off by a cutter, *d*, operated through a lever, G, by the action of the cam 2.

The return of the lever E, by the reaction of a spring or otherwise, will release the grasp of the lever *a* upon the wire, and carry the lever and slide back to regrasp and carry another length of wire to the machine, as before.

H is a circular plate fixed to a shaft, I, and upon the said plate H, at equal distances from each other, I fix holding or carrying dies, *e*, (see figs. 1, 2, and 3.)

The upper surface of the said dies are V-shaped, as seen in fig. 3.

Into these V-shaped dies the wire is fed, as before described, and seen in fig. 2.

*f* is a die, Λ-shaped, upon its under side, as seen in broken lines, fig. 3, which lies in the said die *e*, as seen in fig. 2, and is attached to or made a part of a spring, *g*, which said spring, when free to act, as heretofore described, forces the die down upon the wire to firmly hold it in the said die.

When one length of wire is fed into and held by the said dies, the plate H is moved in the direction denoted by arrows, by means of a pawl, K, by the action of the cam 9, through the levers L and M, as seen in fig. 1, to present the next dies to receive a second piece of wire in like manner as the first, and, so continuing this intermittent progressive movement, wire blanks will be successively supplied to each of the dies as they are presented to the feed for that purpose.

$A^1$, $A^2$, $A^3$, $A^4$, and $A^5$ are instruments of similar construction for forming the head of the needle, a single one of which is shown in fig. 5, and consists of a pair of die-holders, $a^1$ $a^2$, the lower die-holder $a^2$ firmly fixed to a bed, O, the upper attached to or made a part of a spring, N, and secured to the bed O as far back as it conveniently may be, in order to lessen the angle of its vibration.

$A^1$ is a lever hung upon a fulcrum, P, its one end bearing down upon the die-holder $a^1$, the other resting upon the cam which operates it. As its cam re volves to raise its longer arm, the die-holder $a^1$ will be forced down to perform the work required of the dies placed therein.

In order to place the several wires which are carried in the dies, as before described, properly between the dies $a^1$ and $a^2$, I prefer to raise the plate H sufficiently to allow the wire to pass in between the two. This I do by means of a cam, 8, and a lever beneath the bed-plate, denoted in red, upon which the shaft I rests, in similar manner as denoted in fig. 14, and hereafter more fully explained.

The first operation performed by the dies in the instrument $A^1$ is to flatten the wire, as denoted in fig. 6, that in $A^2$ to groove the head, as seen in fig. 7, that in $A^3$ to countersink or partially punch the eye, as seen in fig. 8, that in $A^4$ to complete the eye, as seen in fig. 9, and that in $A^5$ to cut the surplus metal from the head, as seen in fig. 10. This completes the eye.

In the smaller classes of needles a less number of dies may be employed, one die doing the work of two, the two first, flattening and grooving, may be combined in one die. Therefore, while a series of dies is essential, the number in such series may be more or less.

The edge of the head requires other operations to finish it, and for which operations I prefer to turn the needle one fourth over in the holding-dies. This I do by means of a rotating clamp, seen in fig. 11, which consists of two jaws; one, R, fixed to or a part of a spindle, S, the other, $R^1$, hinged to a pivot, $r$, and held open by means of a spring.

T is a collar around the said spindle, which, when forced forward by the action of the the cam 12 through the lever $T^1$, closes the jaw $R^1$, as denoted in red.

The said spindle S is supported so as to revolve in bearings $S^1$, and is caused to make a partial revolution by the action of the cam 10 through a segmental gear, $S^2$, and pinion $S^2$, on the spindle S.

As each of the wires, with their heads formed as before described, is placed between the open jaws R and $R^1$, the collar T is forced forward to grasp the said wire, when, by the action of the cam 10, as before described, the said jaws R will make one-fourth of a revolution, turning the wire with them; this done, the jaws will be opened by the reaction of the cam 12 to withdraw the collar T.

This operation will leave the edges of the head up and down; thence the wire is carried forward, as before described, and presented to the mills $m$ $m$, seen in fig. 12.

The said mills are circular files, made to revolve by power being applied to the pulleys 14 and 15. They are supported in bars $B^1$ resting in frames $B^2$, and caused to advance by the action of the cam 13 through levers $C^1$ and $C^2$.

As the said mills advance to act upon the upper edge of the head, they should rise from the position in black to that denoted in red, (see fig. 12), or for the under edge descend from the position in black to that denoted in red, fig. 13. This is done by means of the inclined plane $B^4$, upon which a shoe, $b^1$, upon the under side of the bars $B^1$ and $B^1$ rides, to guide the mills either up or down, as the case may be.

The mills return to the position denoted in black by the reaction of springs or other known device to accomplish the object.

The two mills $m$ $m$ are made concave or V-shaped. From these two mills the wires are advanced to two other mills, $n$ $n$, operated in similar manner, for the purpose of finishing the head.

These mills should be very fine, and I prefer vulcanite emery wheels for this purpose, with square faces, as seen in figs. 1 and 13½.

When using square-faced wheels it is desirable to use the whole surface of the wheel. For this purpose I place an inclined plane upon the bar $B^1$, as seen in fig. 13½, so that, as the mill advances, it will be forced to one side, and in its retreat it will return to its former position and thus use the whole surface of the face of the mill.

This finishes the head and completes the operations formed upon the wire while it is held in the dies upon the plate H.

To form the point, it is necessary to give to the needles a revolving motion. I therefore remove the wire from the said plate H, for this purpose, and introduce a second plate, $H^1$, upon which are placed spindles, $P^1$, supported in bearings $x$, and made to revolve by means of the wheel $H^2$ revolving against the pulleys $z$, (see fig. 14,) on the said spindle $P^1$, by the application of power to the pulley $H^6$ on the said wheel $H^2$.

The outer ends of the spindles are fitted to receive and hold the wires in the following manner, as seen in fig. 14½.

A hole of the proper size and depth is formed in the end of the spindle.

A lever, $l$, hung within the spindle upon a fulcrum, $r$, bears down upon the wire, denoted in blue, by the force of the spring, denoted in red.

Around the said spindle, and passing over the lever $l$, is placed a collar, $r^2$, and when the said collar is forced back, in the manner hereafter shown, to the position denoted in blue, it will press down the inner end of the lever $l$, opening the outer end, in which position it is ready to receive new wires or discharge those which have been finished.

$P^3$ is an inclined plane or frustum of a cone, fixed to a shaft, $P^4$, and caused to rise and fall by means of the cam 11 acting through the lever $P^5$ below the bed-plate, denoted in red, fig. 1, upon which the said shaft $P^4$ rests.

The upward movement of the inclined plane $P^3$, as from the position in black to that denoted in red, bearing against the inner end of the spindles $P^1$, will cause the said spindles to move outward, as denoted in red, and its descent will allow them to return by the reaction of the spring, denoted in blue.

In order to give to the revolving blanks a progressive movement, the plate $H^1$, on which the spindles $P^1$ are placed, is turned in the direction denoted by arrows by means of the pawl $R^3$, operated by the cam 9 through the levers L M.

The plate H carries the wires until it presents them opposite a spindle, $P^1$, as seen in fig. 1.

At this point the inclined plane $P^3$ is raised, as before described, forcing the spindles outward, and the one to which the wire on the plate H is presented, as in fig. 1, being open, as hereafter described, receives the wire through the hole in its end, as before described.

In this position the collar $r^2$ is forced forward to release the lever $l$, by the action of the cam $l^2$ through the levers $l^3$ and $l^4$, which allows the lever $l$ to firmly grasp the wire, so that, as the spindle retreats on the descent of the inclined plane $P^3$, it will draw the wire from the holding-dies on the plate H.

By the action of the pawl $R^3$, the plate $H^1$, with its spindles, is turned sufficiently to present the next spindle to receive a second piece of wire in like manner as the first, and so on, each successive spindle withdrawing one of the wires from the holding-dies on the plate H, and passing on, presents the wires successively to one or more hammering-dies, $T^2$.

The said hammering-dies are shown in fig. 14, constructed in similar manner to the dies shown in fig. 5, and before described, with this difference, that the lever $T^3$ is caused to vibrate rapidly by the action of a cam, $T^4$, resting in bearings $T^5$, and caused to revolve rapidly by the application of power to the pulley $T^6$.

As the spindles are advanced by the action of the inclined plane $P^3$, as before described, they will insert their wires between the dies $a^4$ $a^5$. The spindle $P^1$ revolving while the wire is between the dies, it will be hammered upon every side, and gradually drawn down to the form of the dies.

If allowed to remain in the first dies sufficiently long, the desired form may be obtained by a single hammer, but I prefer more hammers and less labor for each, and illustrate as using four.

When the wire is withdrawn from the first hammer, the spindles are again advanced by the action of the pawl $R^3$ presenting the wire to the second hammer while the second wire is being operated upon by the first hammer, and so on, presenting the several wires to each hammer until the last, where it is finished so far as can be done by the hammers; thence advancing are presented successively to mills $m^1$ $m^1$, which are revolving rapidly by the application of power to pulleys $n^1$.

For the mills, I prefer fine vulcanite emery mills, yet others may be used.

Figure 15:
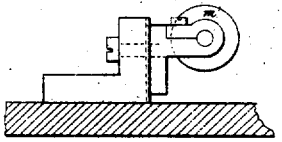

I construct the supports of the said mills as seen in fig. 15.

The mill $m^1$ is hung in a carriage, $S^6$, secured to a support, $S^7$, by means of a screw, $S^8$, and the support slotted in the usual manner for such purposes, so that they may be raised or lowered, as occasion may require; thence advancing, the point thus hammered and polished is presented to a revolving burnisher, $m^2$, supported in like manner as the mills $m^1$ $m^1$ described.

Figure 16:
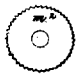

The said burnisher is a hardened steel surface, corrugated as seen in fig. 16, which, rapidly revolving upon the surface of the revolving needle, finishes it complete.

For a smaller or finer class of needles, the mills would be all-sufficient, and the reducing process may be dispensed with.

Figure 17:
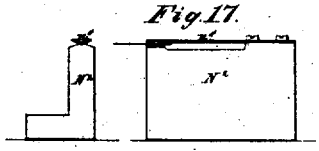

From the mills, the spindles advance until the collar $r^2$ comes in contact with the inclined plane $t$, which forces the said collar back to the position denoted in blue, fig. 14½, raising the lever $l$ from the needle; thence passing on to the discharging device $N^2$, shown in fig. 17, when the spindle, still retaining the wire, forces it beneath a spring, $n^4$, as denoted in blue, fig. 17, which is sufficiently strong to retain the wire while the spindle retreats. The next spindle leaves its needle in like manner, the second needle forcing the first out from the spring, and so on, the spindles passing on to grasp a new piece of wire.

It may be necessary in performing some of the operations upon the wire while in the spindles, to force the spindles outward a greater or lesser distance than in other operations. To do this, the inclined plane should be formed accordingly; that is, a lesser angle or greater, as the distance required for the movement of the spindle is to be more or less.

As the plate H advances the holding-dies to receive new wires, the spring $g$ is raised to allow the wires to be inserted below the die $f$ by a projection, $t^3$, on the spring, (see figs. 2 and 3,) riding up upon an inclined plane, $t^4$, and, as the plate advances, the said projection leaves the inclined plane and permits the spring $g$ to force the die $f$ down upon and hold the wire.

The plate $H^1$, with its spindles, the hammering-dies, and discharging device, are similar to the machine for pointing and reducing wire, for which I have applied for Letters Patent, my application filed March 30, 1865.

The adjustment to accommodate the several instruments to the manufacture of needles of different sizes, as shown in the several drawings, will readily suggest themselves to those skilled in the use of similar machinery.

It will be observed that I have described my machine as first forming the eye, but this is not essential, as the point may be first formed and afterward the eye, but for evident reasons I prefer to first form the eyes.

It will be observed that my machine is practically in two divisions, one forming the eye and head and the other the point, both combined, yet performing their several operations independent of each other.

I claim as my invention—

1. The combination of the series of dies for forming the eye and head of the needle, the said dies being constructed and arranged in the order relative to one another substantially as described, with a series of devices for holding the blanks, and with mechanism to intermittingly transport the said holding devices, and blanks to the several dies of the series, substantially as described.

2. The combination of the series of intermittingly transporting blank-holding devices set forth in the next preceding clause of claim, with the second series of intermittingly-transporting blank-holding devices and mechanism for transferring the blanks from the holders of the first series to those of the second series, substantially as described.

3. The combination of the two series of intermittingly-transporting blank-holding devices, mechanism to transfer the blanks from the holding devices of one series to those of the other series, and the grinding or milling devices, substantially as described.

4. The combination of the feeding device D with the carrier H, constructed to receive the wires, substantially as described, and having an intermittent progressive movement, as and for the purpose specified.

5. The carrier H, having an intermittent progressive movement, in combination with flattening-dies $A^1$, substantially as and for the purpose specified.

6. The carrier H, having an intermittent progressive movement, in combination with grooving-dies $A^2$, substantially as and for the purpose specified.

7. The carrier H, having an intermittent progressive movement, in combination with countersinking-dies $A^3$, substantially as and for the purpose specified.

8. The carrier H, having an intermittent progressive movement, in combination with eye-punching dies $A^4$, substantially as and for the purpose specified.

9. The carrier H, having an intermittent progressive movement, in combination with trimming-dies $A^5$, substantially as and for the purpose specified.

10. The carrier H, having an intermittent progressive movement, in combination with flattening and grooving-dies $A^1$ and $A^2$, substantially as and for the purpose specified.

11. The carrier H, having an intermittent progressive movement, in combination with flattening, grooving, and countersinking-dies $A^1$ $A^2$, and $A^3$, substantially as and for the purpose specified.

12. The carrier H, having an intermittent progressive movement, in combination with flattening, grooving, countersinking and eye-punching dies $A^1$, $A^2$, $A^3$, and $A^4$, substantially as and for the purpose specified.

13. The carrier H, having an intermittent progressive movement, in combination with flattening, grooving, countersinking, eye-punching, and trimming-dies $A^1$ $A^2$ $A^3$ $A^4$ $A^5$, substantially as and for the purpose specified.

14. The carrier H, having an intermittent progressive movement, in combination with grooving, countersinking, eye-punching and trimming-dies $A^2$ $A^3$ $A^4$ $A^5$, substantially as and for the purpose specified.

15. The carrier H, having an intermittent progressive movement, in combination with countersinking, eye-punching and trimming-dies $A^3$ $A^4$ $A^5$, substantially as and for the purpose specified.

16. The carrier H, having an intermittent progressive movement, in combination with eye-punching and trimming-dies $A^4$ and $A^5$, substantially as and for the purpose specified.

17. The carrier H, having an intermittent progressive movement, in combination with one or more finishing-mills *m m n n*, buffs or burnishing-mills, or their equivalents, as and for the purpose specified.

18. The carrier H, having an intermittent progressive movement, in combination with a carrier $H^1$, provided with revolving spindles $P^1$, and having an intermittent progressive movement, substantially as and for the purpose specified.

19. The combination of the cone $P^3$, or its equivalent, with the spindles $P^1$, substantially as and for the purpose specified.

20. The combination of the cone $P^3$ with the carrier $H^1$, provided with revolving spindles, and having an intermittent progressive movement, substantially as and for the purpose specified.

21. The direct combination of revolving spindles $P^1$ with one or more intermittent hammers $T^2$, and one or more grinding, filing, polishing, or burnishing-wheels, arranged substantially as and for the purpose specified.

C. O. CROSBY.

Witnesses:
A. J. TIBBITS,
J. H. SHUMWAY.